United States Patent

[11] 3,623,504

[72] Inventor Joseph W. Davis
Springfield, Ill.
[21] Appl. No. 28,305
[22] Filed Apr. 14, 1970
[45] Patented Nov. 30, 1971
[73] Assignee Stewart-Warner Corporation
Chicago, Ill.

[54] CHECK VALVE ASSEMBLY
11 Claims, 4 Drawing Figs.
[52] U.S. Cl. ................................................ 137/525,
[51] Int. Cl. ................................................ 137/525.1
[50] Field of Search ........................................ F16k 15/14
137/525,
525.1, 526; 251/333

[56] References Cited
UNITED STATES PATENTS
3,010,477 11/1961 Graham .................. 137/525
2,367,989 1/1945 Alders .................... 137/526
3,065,761 11/1962 Peras ..................... 137/525
3,006,363 10/1961 Jackson .................. 137/525

Primary Examiner—Samuel B. Rothberg
Assistant Examiner—William H. Wright
Attorneys—Augustus G. Douvas, William J. Newman and Norton Lesser ABSTRACT: The following specification describes a check valve assembly in which a plural-sided interconnecting passageway is provided between passageways in adjacent couplings. A flexible rectangular diaphragm longer than the distance between two of the sides in the interconnecting passageway is deposited between the two sides so that the diaphragm is bent into a loop or U with the backwall adapted to move against or from the end of one coupling passageway to close or open the same. A stop in the interconnecting passageway prevents excessive inward bending or movement of the diaphragm.

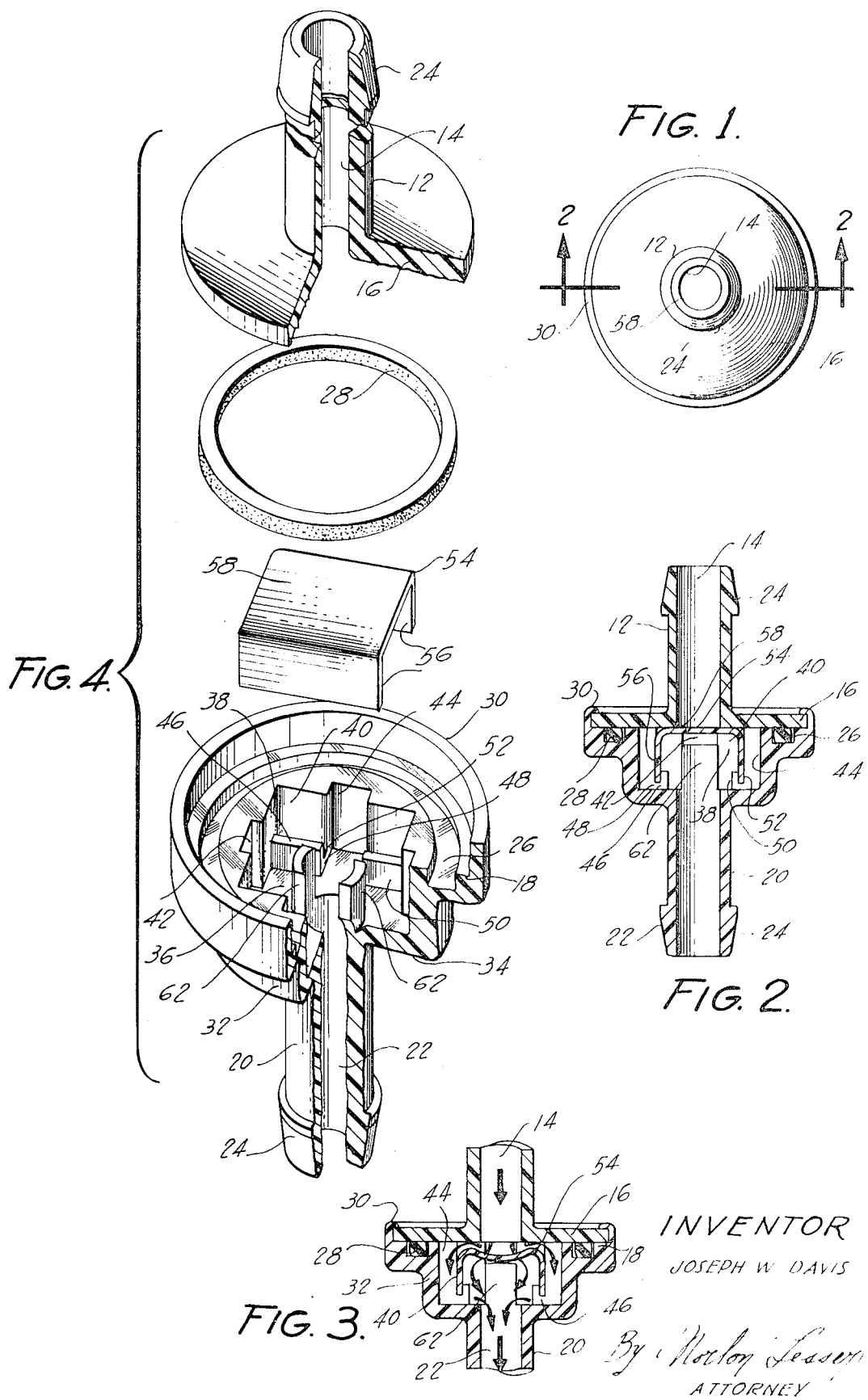

CHECK VALVE ASSEMBLY

BACKGROUND OF THE INVENTION

1. Field of the Invention

This invention relates in general to check valves used in vehicular vacuum systems and more particularly to an economical durable vacuum check valve of improved sealing and gas-passing character.

2. Description of the Prior Art

Check valves for use in vehicular or automotive vacuum systems typically must be capable of maintaining a pressure difference for at least 1 hour with an initial pressure difference equivalent to 1 inch Hg over a temperature range of −40° F. to 240° F. and open with a pressure difference of 2 inches Hg to 5 inches Hg dependent on the temperature. In addition, the valve must not lose more than 1 inch Hg of pressure with an initial reservoir vacuum of 10 inches Hg to 15 inches Hg and perform these tests after a durability test of at least 40,000 cycles. In addition, the valve must be capable of meeting several other requirements including the passage of at least 60 cubic feet per hour with a pressure drop not exceeding 2 inches Hg. Economical check valves for performing in accordance with the above requirements usually comprise a diaphragm or flap which has a portion clamped between the two coupling elements as typified by U.S. Pat. application Ser. No. 816,899, filed Apr. 17, 1969 by Eric Gregg and R. E. Hunter; however, these types of valves usually fail to pass air at adequate rates, seal properly or perform consistently over a long duration or long periods of use, and especially at low temperatures and/or low-pressure differences.

SUMMARY OF THE INVENTION

The present invention proposes to solve the above problems by providing a plural-sided interconnecting passageway between two coupling passageways with a separable thin diaphragm of rectangular configuration deposited within the interconnecting passageway. The diaphragm is longer than the distance between the two sides so that the diaphragm assumes a U-shape extending over the cross section of the interconnecting passageway and one of the coupling passageways to normally close the one coupling passageway. Channels or slots in the plural-sided passageway permit the facile passage of air between the coupling passageways with the minimum of interferences. A stop wall prevents unnecessarily large diaphragm flexure or movement to avoid diaphragm misalignment. In addition, the diaphragm is formed of resilient material and provides excellent low-temperature operation at low-pressure differences.

It is therefore an object of the present invention to provide an economical check valve having improved sealing and gas-passing characteristics.

Other objects and features of this invention will become apparent upon examination of the following specification, claims and drawings.

BRIEF DESCRIPTION OF THE DRAWING

FIG. 1 is an end view of the check valve assembly incorporating the principles of the present invention;

FIG. 2 is a sectional view taken along the line 2—2 in FIG. 1 and illustrating the valve in closed position;

FIG. 3 is a fragmentary sectional view illustrating the valve in open position; and FIG. 4 is an exploded isometric view of the check valve assembly with portions of each coupling in section.

DESCRIPTION OF THE PREFERRED EMBODIMENT

Referring to FIG. 1, a check valve assembly is indicated therein by the reference character 10. The check valve assembly 10 comprises a valve body or tubular coupling 12 of a moulded plastic such as acetal resin. The coupling 12 defines a cylindrical passageway 14 of about 0.2 inch diameter and terminates at one end in an annular flange wall 26 of substantially 0.95 inch extending radially outwardly of passageway 14 for abutting engagement with an annular flange wall 18 of similar diameter formed at the end of a cup-shaped flange 19 on one end of a second valve body or tubular coupling 20. Coupling 20 is of a moulded plastic such as acetal resin and defines a cylindrical passageway 22 of substantially 0.2 inch diameter coaxial with passageway 14. Both couplings 12 and 20 are provided with conventional tapered shoulders 24 at the ends opposite walls 16 and 18 respectively for receiving respective hose ends adapted to be coupled to a source of vacuum or air pressure, respectively.

Flange wall 18 has an annular recess 26 therein for receiving a sealing ring or gasket 28 in abutment with wall 16. An axially extending annular lip 30 of substantially 0.95 inch internal diameter along the outer periphery of wall 18 peripherally encircles flange wall 16. The lip 30 is formed over the surface of wall 16 opposite wall 18 and is ultrasonically welded or staked to wall 16 to fix the couplings together and seal the walls 16 and 18 against gas passage therebetween.

The cup-shaped flange 19 includes a rim wall 32 having an external diameter of 0.67 inch and extending rearwardly from the wall 18 to an annular backwall 34 formed at the corresponding end of coupling 20 and spaced substantially one-quarter inch from wall 16. Walls 18 and 32 define a central cavity or passageway 36 of square cross section coaxial with passageways 14 and 22 and in communication therewith. Cavity 36 extends to the backwall 34 and has two opposing sidewalls 38 spaced from each other by substantially 0.04 inch and the other pair of opposing sidewalls 40 spaced by the same distance.

Each sidewall 38 and 40 has an axially extending shallow channel or slot 42 and 44 respectively formed centrally therein. The slots 42 and 44 are extended to the backwall 36 and are substantially 0.12 inch wide and 0.06 inch deep. An L-shaped ledge wall 46 is formed on opposite edges of each slot 44 with one leg 48 substantially 0.06 thick abutting wall 34 and extending radially inwardly of wall 42 for substantially 0.066 inch and the other leg 50 substantially 0.04 inch thick extending from wall 34 substantially 0.11 inch to form a recess or slot 52 between leg 50 and wall 42 substantially 0.05 inch deep and 0.026 inch wide to receive a respective end of a flexible diaphragm or flap 54 of flurosilicone rubber.

Diaphragm 54 is substantially 0.02 inch thick and rectangular in shape with a width of 0.384 inch corresponding to the distance between walls 38 and a length of substantially 0.722 inch so that it is longer than the distance between walls 40 and extends along the depth or length of each wall 40 by an amount sufficient to enable the ends of the diaphragm to rest in respective recesses 52. The diaphragm 54 therefore forms a generally U-shaped configuration having legs 56 separable from walls 40 and a backwall 58 with the backwall 58 extending between the walls 40 and abutting wall 16 to completely close the passageway 14.

A pair of axially extending projections or stop walls 62 spaced 180° from each other extend from the wall 34 directly adjacent the passageway 18 with a correspondingly shaped inner radius to a position spaced about 0.08 inch from the wall 16 to enable the backwall 58 of the diaphragm to flex away from wall 16 and yet serve as a stop to limit the flexure. The walls 62 are substantially 0.05 inch thick and are substantially as wide as slots 42 and located along the same radial axis as slots 42 so that walls 62 are spaced substantially 0.06 inch from each wall 38 and 0.17 inch from wall 40. The spaces between walls 62 provide communication between passageways 22 and 36.

With no pressure difference between the passageways 14 and 22, the backwall 58 of diaphragm 54 is normally biased against wall 16 to close passageway 14. When a vacuum is applied to passageway 14, the pressure difference between passageways 14 and 22 also acts against the backwall 58 of diaphragm 54 to force the backwall 58 against wall 16 and maintain passageway 14 closed, as seen in FIG. 2. On the other hand, when greater pressure is applied to passageway 14 than is present in passageway 22, the backwall 58 of diaphragm 54 is forced away from passageway 14 and the air passes freely through the expanded passage provided by slots 42 and 44 in walls 38 and 40 with slots 44 extending beneath the legs 56 of the diaphragm; whereafter, air freely passes through the space between walls 62 and into passageway 22, thereby ensuring adequate gas passage together with quick opening of the diaphragm. The walls 62 limit the flexure of backwall 58 and serve with the confining configuration of walls 38 and 40 to prevent diaphragm misalignment or excessive flexure which may thereafter result in inadequate sealing of passageway 14. The legs 56 are separable from the walls 40; however, the walls 46 serve to restrain radial movement of the ends of legs 56 or movement in a direction away from walls 16 and 18 while imparting some rigidity to legs 56.

The foregoing is a description of an improved check valve assembly whose inventive concepts are believed set forth in the accompanying claims.

What is claimed is:

1. A check valve assembly comprising a first coupling defining a first passageway having an axis, a second coupling defining a second passageway, a passageway interconnecting said coupling passageways and having spaced wall portions extending axially of said passageways, a flexible diaphragm having axially extending legs separably engaging said spaced wall portions and extending between said wall portions to form a perpendicular wall adjacent the end of said first coupling passageway and perpendicular to the axis of said first coupling passageway for closing said first passageway and adapted to move from adjacent the end of said first passageway to permit communication between said first passageway and said interconnecting passageway in response to the pressure in said one passageway being greater than the pressure in said second passageway, and means in said interconnecting passageway engaging said axially extending diaphragm legs to prevent axial movement of said legs in a direction from said first passageway irrespective of said perpendicular wall either closing said first passageway or moving from the end of said first passageway.

2. In the check valve assembly claimed in claim 1, means in said interconnecting passageway spaced beyond the boundary of said diaphragm for facilitating communication from said one passageway to said second passageway in response to said perpendicular wall moving from adjacent the end of said first passageway.

3. In the check valve assembly claimed in claim 1, means for limiting movement of said perpendicular wall to a predetermined distance from said first passageway for limiting separation between said spaced wall portions and diaphragm.

4. A check valve assembly comprising a first coupling defining a first passageway having an axis, a second coupling defining a second passageway, means spacing said passageways with said couplings in abutment and sealing the juncture of said couplings against leakage, a passageway interconnecting said coupling passageways and having opposing wall portions, a flexible diaphragm having axially extending legs separably engaging said opposing wall portions of said interconnecting passageway and extending between said wall portions to form a radial wall extending radially of said first passageway axis and spaced adjacent one end of said first coupling passageway for closing said first passageway and adapted to flex from adjacent said first passageway to permit communication between said first passageway and said interconnecting passageway in response to the pressure in said one passageway being greater than the pressure in said second passageway, means holding the ends of said diaphragm legs against axial movement in a direction toward said second passageway irrespective of said radial wall either closing said first passageway or flexing from adjacent said first passageway, and means for limiting movement of said radial wall to a predetermined distance from adjacent the end of said first passageway for limiting separation of said diaphragm from said opposing wall portions.

5. A check valve assembly comprising a first coupling defining a first passageway having an axis, a second coupling defining a second passageway, means spacing said passageways with said couplings in abutment and sealing the juncture of said couplings against leakage, a passageway interconnecting said coupling passageways and having opposing wall portions, a flexible diaphragm separably engaging said opposing wall portions of said interconnecting passageway and extending between said wall portions to form a radial wall extending radially of said first passageway axis and adjacent one end of said first coupling passageway for closing said first passageway and adapted to flex from adjacent said first passageway to permit communication between said first passageway and said interconnecting passageway in response to the pressure in said one passageway being greater than the pressure in said second passageway, means for limiting movement of said radial wall to a predetermined distance from adjacent the end of said first passageway for limiting separation of said diaphragm from said opposing wall portions, and a channel in said opposing wall portions of said interconnecting passageway for facilitating communication from said one passageway to said second passageway in response to said radial wall moving from said first passageway.

6. A check valve assembly comprising a first coupling defining a first passageway having an axis, a second coupling defining a second passageway, means spacing said passageways with said couplings in abutment and sealing the juncture of said couplings against leakage, a passageway interconnecting said coupling passageways and having opposing wall portions, a flexible diaphragm having legs separably engaging said opposing wall portions of said interconnecting passageway and extending between said wall portions to form a radial wall extending radially of said first passageway axis and adjacent one end of said first coupling passageway for closing said first passageway and adapted to flex from adjacent said first passageway to permit communication between said first passageway and said interconnecting passageway in response to the pressure in said one passageway being greater than the pressure in said second passageway, means for limiting movement of said radial wall to a predetermined distance from adjacent the end of said first passageway for limiting separation of said diaphragm from said opposing wall portions, said opposing wall portions each having a longitudinal axis spaced 180° apart, and said diaphragm legs being separably engaged in parallel relationship with a respective one of said wall portions.

7. A check valve assembly comprising a first coupling defining a first passageway having an axis, a second coupling defining a second passageway, means spacing said passageways with said couplings in abutment and sealing the juncture of said couplings against leakage, a passageway interconnecting said coupling passageways and having opposing wall portions, a flexible diaphragm separably engaging said opposing wall portions of said interconnecting passageway and extending between said wall portions to form a radial wall extending radially of said first passageway axis and adjacent one end of said first coupling passageway for closing said first passageway and adapted to flex from adjacent said first passageway to permit communication between said first passageway and said interconnecting passageway in response to the pressure in said one passageway being greater than the pressure in said second passageway, means for limiting movement of said radial wall to a predetermined distance from adjacent the end of said first passageway for limiting separation of said diaphragm from said opposing wall portions, said diaphragm having a rectangular configuration with the major dimension in excess of the distance between said opposing wall portions, all of said passageways being in coaxial alignment and said interconnecting passageway having a plurality of pairs of opposing wall portions with one pair of said wall portions each engaging a respective portion of said rectangular diaphragm, and an annular wall extending from the periphery of one end of said second passageway and spaced from one end of said first passageway for terminating said interconnecting passageway.

8. The check valve assembly claimed in claim 7 in which each of said opposing wall portions has a slot extending from said first coupling to said annular wall.

9. In the check valve assembly claimed in claim 8 an L-shaped wall formed at the juncture of each wall portion of said one pair with said annular wall with one leg of said L-shaped wall spaced from the adjacent wall portion of said pair for separably receiving a respective diaphragm end therebetween.

10. A check valve assembly comprising a first coupling defining a first axial passageway therethrough, a second coupling defining a second axial passageway therethrough adapted to be placed in coaxial relationship to said first coupling passageway with said couplings in abutment, means spacing said passageways axially and sealing the juncture of said couplings against leakage, a passageway having a plurality of axially extending sides interconnecting said coupling passageways, a flexible diaphragm extending between one pair of said sides and having legs each in generally parallel separable engagement with a respective one of said pair of axially extending sides whereby said diaphragm forms a radially extending backwall adjacent said first coupling passageway for closing said first passageway in response to the pressure in said second passageway being greater than the pressure in said first passageway and adapted to move from said first passageway to permit communication between said first passageway and plural-sided passageway in response to the pressure in said one passageway being greater than the pressure in said second passageway, means in said plural-sided passageway for establishing communication from said one passageway to said second passageway in response to said backwall moving from said first passageway, a pair of spaced stop walls in said plural-sided passageway for limiting movement of said diaphragm backwall to a predetermined distance from said first passageway, and means intermediate said pair of axially extending sides engaging said diaphragm legs to prevent axial movement of said legs toward said second passageway irrespective of the position of said diaphragm backwall relative said first and second passageways.

11. A check valve assembly comprising a first tubular coupling adapted to receive a hose at one end and having one cylindrical passageway therein for communication with said hose, a second tubular coupling having another cylindrical passageway therein and adapted to receive a hose at one end for communication with said other passageway, one annular flange wall at the end of said first coupling opposite said one end extending radially from the periphery of said one passageway and adjacent said second coupling, another annular flange wall at the end of said second coupling adjacent said one flange wall for abutting engagement with said one flange wall, an axially extending lip on said other flange wall for overlapping engagement with said one annular flange wall and peripherally fixed to said one flange wall to place said passageways in coaxial alignment, said other flange wall having an annular recess adjacent said one flange wall, a sealing ring in said recess for engagement with said annular flange wall to seal the juncture of said flange walls against the passage of fluid therebetween, a cup-shaped wall integrally formed between said other flange wall and said second coupling, said other flange wall and said cup-shaped wall defining an internal passageway having flat sides coaxial with said coupling passageways and in communication with said coupling passageways, each side of said internal passageways having a slot formed therein extending from said one flange wall to the backwall of said cup-shaped wall, an L-shaped ledge wall formed at the juncture of one pair of said sides and said backwall and located on opposite sides of the slots formed in said one pair of sides with one leg of said L-shaped walls formed on said backwall and the other leg spaced from and parallel to the adjacent one of said pair of sides to form a recess therebetween, a pair of spaced projections extending from said backwall adjacent said other coupling passageway toward said one annular flange wall, and a flexible diaphragm having one pair of edges each engaged in a respective recess between said L-shaped ledge walls and the adjacent one of said pair of sides with the distance between the pair of edges being of a length to cause said diaphragm to assume a generally U-shape with the backwall of said U adapted to reciprocate between a position abutting said one annular flange wall to close said one coupling passageway and a position adjacent said projections for opening said one coupling passageway dependent on the pressure difference between said coupling passageways.

* * * * *